H. W. MACKENZIE.
APPARATUS FOR USE IN BAKING WAFERS AND THE LIKE.
APPLICATION FILED JUNE 16, 1915.
1,215,829.
Patented Feb. 13, 1917.
3 SHEETS—SHEET 1.
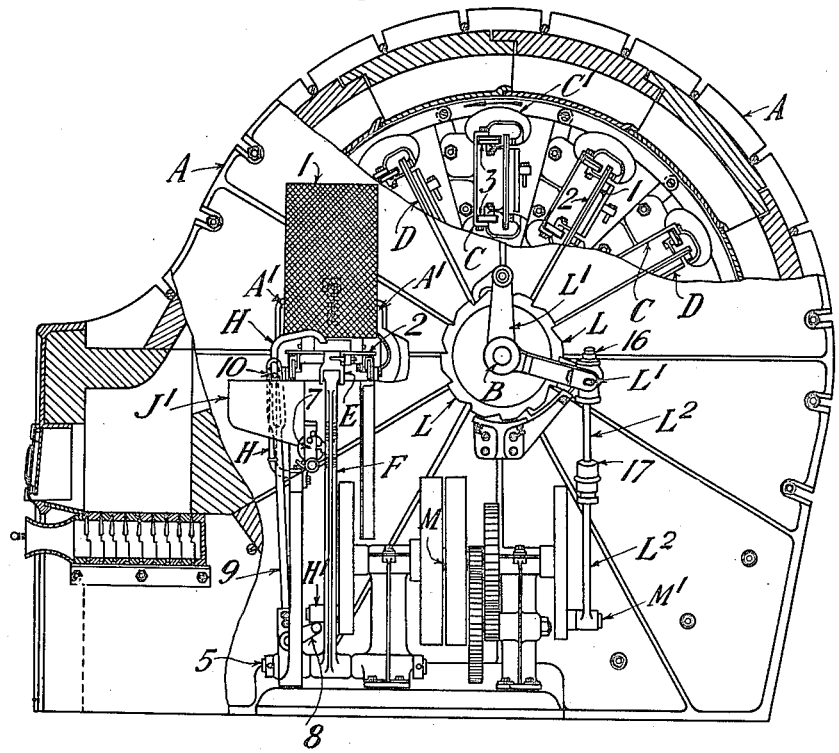
FIG: 1.
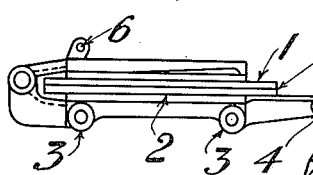
FIG: 3.
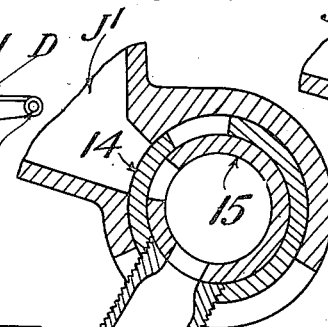
FIG: 4.
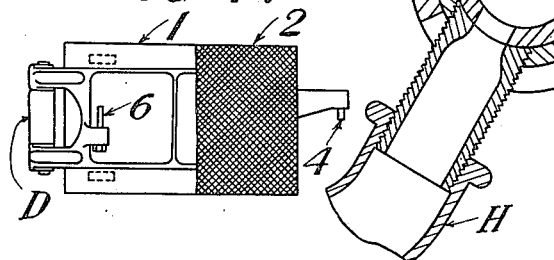
FIG: 5.
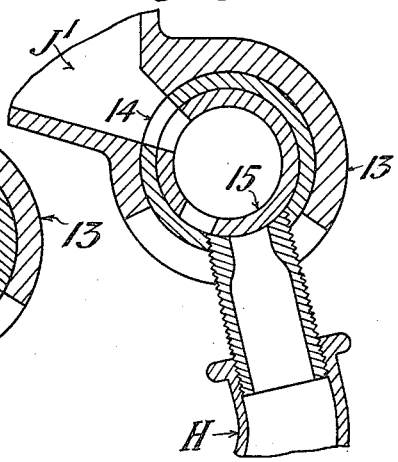
FIG: 6.
Inventor.
Hugh Watson Mackenzie
By T. Walter Fowler
atty.

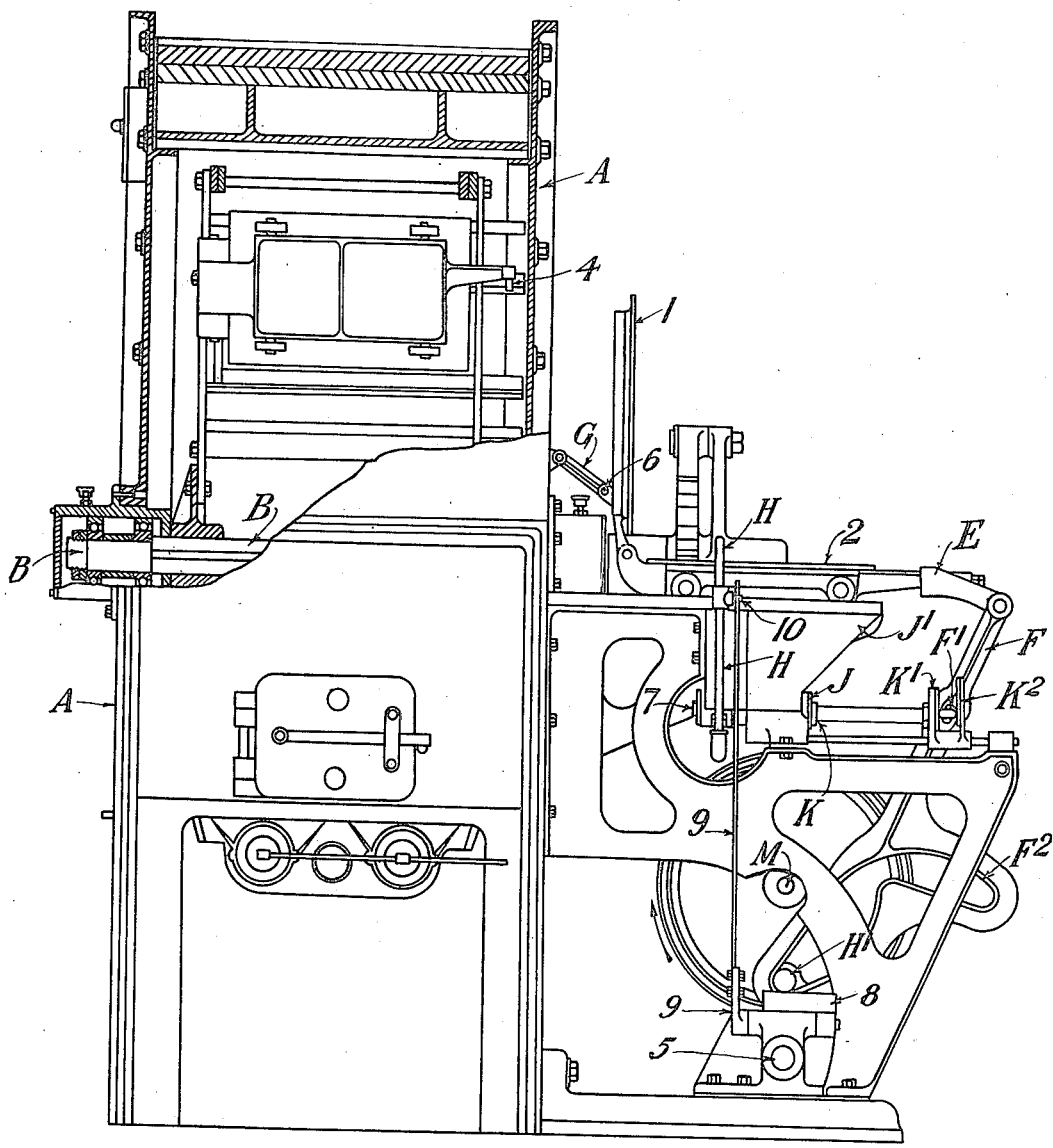

H. W. MACKENZIE.
APPARATUS FOR USE IN BAKING WAFERS AND THE LIKE.
APPLICATION FILED JUNE 16, 1915.
1,215,829.
Patented Feb. 13, 1917.
3 SHEETS—SHEET 3.
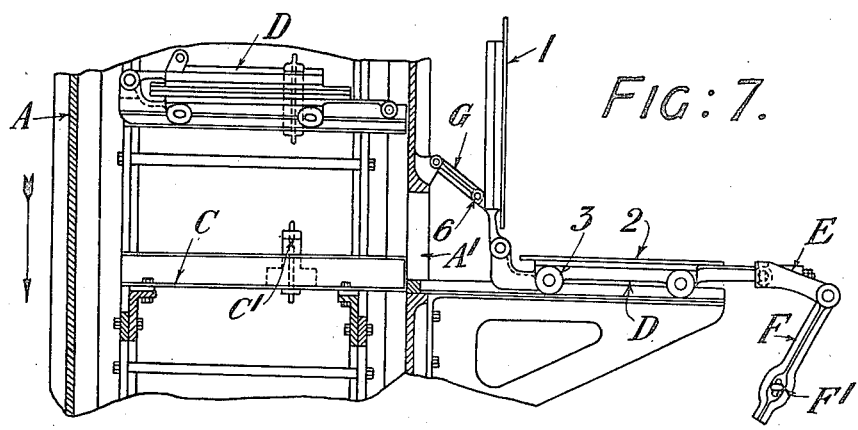
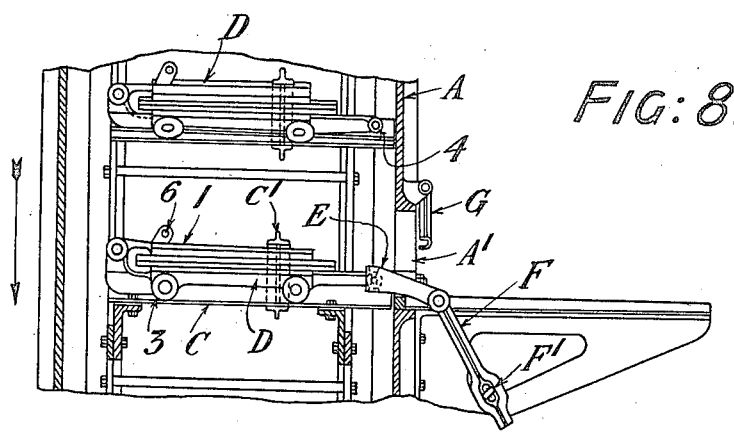
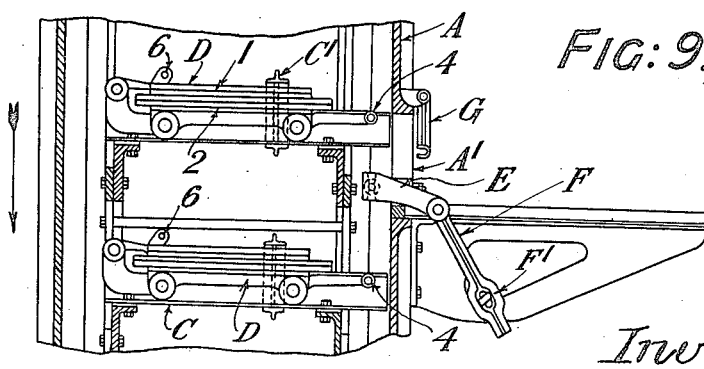
Inventor.
Hugh Watson Mackenzie
By T. Walter Fowler
atty.

UNITED STATES PATENT OFFICE.

HUGH WATSON MACKENZIE, OF LEEDS, ENGLAND.

APPARATUS FOR USE IN BAKING WAFERS AND THE LIKE.

1,215,829.   Specification of Letters Patent.   Patented Feb. 13, 1917.

Application filed June 16, 1915. Serial No. 34,455.

*To all whom it may concern:*

Be it known that I, HUGH WATSON MACKENZIE, a subject of the King of Great Britain and Ireland, residing at 12 Avenue Hill, Harehills, Leeds, England, have invented new and useful Improvements in or Connected with Apparatus for Use in Baking Wafers and the like, of which the following is a specification.

Apparatus for use in baking wafers and the like, hereinafter generally referred to as wafers, for the purposes of this invention is provided with an oven into which molds are adapted to be passed and, at one or at more positions, withdrawn from the oven to enable their contents when baked to be removed, the molds recharged and again passed into the oven. For convenience of description it will be assumed that the molds are withdrawn from the oven at one position only, but it is to be understood that more than one position for withdrawal may be provided and that after being passed into the oven the molds may be withdrawn at the same or at a different position after the baking has been completed.

This invention, which refers to improvements in or connected with apparatus for baking wafers, relates to the provision of means for mechanically effecting some of the operations incident to the baking of wafers by the use of ovens into which the molds are adapted to be passed, including, if required, the withdrawal of the molds from the oven, opening the molds to permit the removal of their baked contents, recharging the molds, reintroduction of the molds into the oven, imparting the motion required to effect the travel of the molds, and other improvements.

An oven for the purpose of this invention is provided with means upon which the molds are adapted to be mounted and moved in a circuit, or partial circuit, (hereinafter referred to as a circuit) through the heated interior of the oven, the circuit produced being restricted to the interior of the oven and the withdrawal from and reintroduction of the molds into the oven effected by hand or mechanically. In one system of passing the molds through the oven, the circuit is made by successive steps, and the molds are each in succession brought opposite an opening in the oven, and the means on which they are mounted come to rest for a period sufficiently long to permit the mold to be withdrawn, opened, its contents removed, recharged and reintroduced into the oven upon its circuit carrier. For this purpose there may be provided a coupling which becomes connected with the mold when it is opposite the opening and is operated mechanically to withdraw the mold, and in order to open the mold an opening device may be provided adapted to be brought into action as the mold leaves the oven so that when the mold is withdrawn to its full extent it stands open to permit the baked wafer to be removed. For the purpose of recharging the mold, there may be provided a feeding device having a delivery pipe comprising a spout or spouts arranged, or adapted to be brought into position over the base of the open mold shortly after the withdrawal has been completed, after which mechanism may operate to move the mold for its reintroduction into the oven, and in the initial part of this movement a pump forming a part of the feeding device may be operated to deliver a charge of wafer material through the delivery pipe onto the base of the mold, and, after this has been done, the pipe, if previously brought into position, may be returned to its original position, the cover of the mold closed down, the mold reintroduced into the oven, placed upon its circuit carrier, and its cover locked to its base. Circuit operating mechanism may then be brought into action to advance the series of molds in the oven one step in the initial movement of which the newly charged mold passes clear of the coupling, an engagement being subsequently made with the next mold of the series.

Some examples of construction according to this invention will now be described with reference to the accompanying drawings, in which:—

Figure 1 is a front elevation partly in section, and Fig. 2 is an end elevation partly in section, showing an oven and apparatus according to this invention.

Fig. 3 is an end elevation, in the sense used with reference to Figs. 1 and 2, of a mold, and Fig. 4 is a plan with a portion of the mold broken away.

Figs. 5 and 6 are cross sectional views showing portions of a feeding device.

Figs. 7, 8 and 9 are cross sectional end views showing a part of the oven and portions of the mechanism in successive stages of operation.

In the construction illustrated, A designates a cylindrical oven arranged with its axis horizontal, B a shaft, mounted about the axis of the oven, furnished with a frame having a radial series of carriers C upon which molds D are adapted to be moved in a direction parallel to the shaft B. The molds D, each of which comprises a cover 1 and a base 2, are supported upon wheels 3 as shown, or runners might be provided in substitution therefor. For locking the cover 1 and the base 2 of each of the molds together and for retaining the molds in position when placed upon their carriers C there is associated with each carrier C locking guides $C^1$ for the mold when introduced to pass beneath.

The shaft B with its frame and carriers C is adapted to be rotated, by means hereinafter described, so that the molds B are caused to pass in a circular circuit through the heated interior of the oven, the circuit being made by successive steps in the course of which the molds are each in succession brought opposite an opening $A^1$ in the oven, and when in this position come to rest for a period sufficiently long to permit the mold to be withdrawn, opened, its contents removed, recharged and reintroduced into the oven upon its carrier.

For withdrawing the molds from the oven a coupling E is provided which, as shown, may consist of an arm having a head vertically slotted into which a tongue 4 on each mold D as it passes into position for withdrawal is adapted to enter and be temporarily retained, for example, a spring clip may be fitted within the head to hold the tongue 4. In an alternative form, not shown in the drawings, the tongue 4 could be slotted and the head of the coupling E formed with a tongue, or other form of coupling might be provided. The coupling E extends from the head of a rocking lever F mounted on a pivot 5, see Figs. 1 and 2, placed at right angles to the shaft B and at a distance from the face of the oven A.

For opening the mold, a depending pivoted catch G is mounted at or near the face of the oven and the cover 1 of each mold D is provided with a part 6 for the catch G to engage with as the mold is withdrawn, the closure of the cover 1 being effected as the mold D is reinserted by the resistance which the catch G offers against the cover 1 as the mold passes into the opening $A^1$ of the oven. Other suitable means, however, may be provided to effect the opening and closing of the molds.

For recharging the molds when in their withdrawn position there may be provided a feeding device having a delivery pipe comprising a spout or spouts. For this purpose the delivery pipe of the feeding device may, if required, normally stand clear of the position occupied by the withdrawn mold, and as or after the withdrawal of the mold is completed be turned so as to direct its delivery onto, or about the center of, the base 2 of the open mold. In the construction illustrated, H designates the delivery pipe which is pivoted to turn about an axis at 7. The pipe H normally stands clear of the position occupied by the withdrawn mold and is brought into the feeding position mechanically by a tappet $H^1$ acting upon the end of an arm 8 of a bell crank lever 8, 9, the arm 9 of which is slotted at its outer end to receive a stud 10 projecting from the delivery pipe H. The delivery pipe H is associated with the barrel of a pump J and a supply reservoir $J^1$ arranged so that when the delivery pipe H is in its normal position communication is established between the barrel of the pump J and the reservoir $J^1$ to permit wafer material to enter and charge the barrel, and when the delivery pipe H is turned into its feeding position arranged to close the connection between the barrel of the pump and the reservoir $J^1$ and establish a connection between the delivery pipe H and the barrel. For this purpose, in the form of construction shown, see Figs. 5 and 6, three concentric sleeves 13, 14 and 15 are provided, the outer one 13 and inner one 15 being fixed and the intermediate one 14 connected to the delivery pipe H being rotatable, ports, as shown, being provided to establish the necessary connections, the conditions shown at Fig. 5 being those established when the pipe H is in position for delivering a charge onto a mold and those shown at Fig. 6 established when the pipe H is in its normal position. For expelling the charge from the barrel of the pump, a piston K is provided operated by the rocking lever F in conjunction with the means which act to reintroduce the mold into the oven, in the initial part of the movement thereof, and after the charge has been delivered the piston K stops and the delivery pipe H is released to return to its normal position, after which the introduction of the mold into the oven is completed. For regulating the quantity of wafer material to be delivered in a charge provision may be made for varying the length of stroke of the piston K, for instance, its delivery stroke may, as shown, be made by an abutment $F^1$ carried upon the rocking lever F acting against a shoulder $K^1$ fixed on the rod of the piston K and so arranged that the abutment F¹ at any required position may pass clear of the shoulder K¹, and the suction stroke of the piston K made by the abutment F¹ acting against a shoulder K², fixed on the rod of the piston and facing the shoulder K¹. For imparting the step-by-step motion to the frame upon which the carriers C are fixed, the shaft B is driven through a ratchet wheel L, see Fig. 1, acted on by a pawl carried upon an arm L¹ actuated by tappets 16 and 17 on a reciprocating rod L², the tappets 16 and 17 being arranged to come into contact with the arm L¹ alternately each on opposite sides when the rod L² approaches the completion of each of its reciprocations.

The operations explained, or any of them that may be required, can be obtained from the motion of a single rotating shaft M, for example, as shown, a crank M¹ is provided on the shaft to reciprocate the rod L², and the tappet H¹, for bringing the delivery pipe H into its feeding position may also be operated from the shaft M. In the construction illustrated the tappet H¹ consists of a second crank on the shaft M, arranged to also move the rocking lever F about its pivot 5 in a manner which will enable the required sequence of operations to be performed by parts associated therewith. In the construction illustrated, the rocking lever F is provided with a cam groove F² into which the crank pin tappet H¹ is adapted to engage, the cam groove F² being so formed that with the coupling E, connected to the head of the rocking lever F, in engagement with a mold D, and with the shaft M rotating in the direction of the arrow, the crank pin tappet H¹ in passing through approximately a quarter of a revolution will withdraw the rocking lever F to its full extent, while the mold D is withdrawn and opened, see Fig. 7. In the second approximate quarter of a revolution, ending at the position in which it is shown in Fig. 2, the crank pin tappet H¹ passes without altering the position of the rocking lever, while the baked wafer is removed and the delivery pipe H brought into its feeding position by the action of the tappet H¹ on the arm 8. In the third approximate quarter of a revolution, starting from the position in which it is shown in Fig. 2, the crank pin tappet H¹ operates to turn the rocking lever F to its full inward extent, while the piston K of the pump J is operated, after which the delivery pipe H is released and the mold D finally reintroduced, see Fig. 8, and in the last approximate quarter of a revolution the crank passes without affecting the position of the rocking lever F, while the reciprocating rod L², by means of the tappet 17, acting upon the arm L¹, operates to move the shaft B with the frame and its carriers C one step, carrying the newly introduced mold clear of the coupling E, see Fig. 9, and forward to begin its circuit while bringing a mold at the completion of its circuit, with its baked wafer, into position for engagement with the coupling E.

In some cases more than one frame may be mounted about the same axis and operated by the same shaft in conjunction with one oven, or one shaft may be arranged to extend through two or more separate ovens, associated with means according to this invention arranged to operate synchronously, alternately or otherwise.

I claim:—

1. Apparatus for baking wafers, consisting of an oven, an opening in the oven, carriers within the oven upon which molds each comprising a cover and a base are adapted to be mounted, means for moving the carriers each in a circuit through the heated interior of the oven, means for operating the carriers so that each carrier with its mold at the completion of its circuit is brought opposite the opening, means for removing the mold on the completion of its circuit from its carrier and withdrawing it from the oven, means for opening the mold when withdrawn to permit the removal of its baked contents, means for recharging the mold, and means for closing and reintroducing the mold into the oven and replacing it upon its carrier.

2. Apparatus for baking wafers, consisting of an oven, an opening in the oven, carriers within the oven upon which molds each comprising a cover and a base are adapted to be mounted, means for moving the carriers by successive steps in a circuit through the heated interior of the oven, means for operating the carriers so that on the completion of each step a carrier with its mold completes its circuit and is brought opposite the opening, means for removing the mold on the completion of its circuit from its carrier and withdrawing it from the oven, means for opening the mold when withdrawn to permit the removal of its baked contents, means for recharging the mold, and means for closing and reintroducing the mold into the oven and replacing it upon its carrier.

3. Apparatus for baking wafers, consisting of an oven, an opening in the oven, carriers within the oven upon which molds each comprising a cover and a base are adapted to be mounted, means for moving the carriers each in a circuit through the heated interior of the oven, means for operating the carriers so that each carrier with its mold at the completion of its circuit is brought opposite the opening, a coupling which becomes connected with the mold as it completes its circuit, means for operating the coupling to remove the mold on the completion of its circuit from its carrier and withdraw it from the oven, means for opening the mold when withdrawn to permit the removal of its baked contents, means for recharging the mold, and means for closing and reintroducing the mold into the oven and replacing it upon its carrier.

4. Apparatus for baking wafers, consisting of an oven, an opening in the oven, carriers within the oven upon which molds each comprising a cover and a base are adapted to be mounted, means for moving the carriers each in a circuit through the heated interior of the oven, means for operating the carriers so that each carrier with its mold at the completion of its circuit is brought opposite the opening, means for removing the mold on the completion of its circuit from its carrier and withdrawing it from the oven, a mechanical device for opening the mold as the withdrawal takes place to permit the removal of its baked contents, means for recharging the mold, means comprising the mechanical device for closing the mold, and means for reintroducing the mold into the oven and replacing it upon its carrier.

5. Apparatus for baking wafers, consisting of an oven, an opening in the oven, carriers within the oven upon which molds each comprising a cover and a base are adapted to be mounted, means for moving the carriers by successive steps in a circuit through the heated interior of the oven, means for operating the carriers so that on the completion of each step a carrier with its mold completes its circuit and is brought opposite the opening, means for removing the mold on the completion of its circuit from its carrier and withdrawing it from the oven, means for opening the mold when withdrawn to permit the removal of its baked contents, a feeding device comprising a pump and a delivery pipe for recharging the mold, means for operating the pump to deliver a charge of wafer material through the delivery pipe onto the base of the open mold, reintroducing the mold into the oven and replacing it upon its carrier.

6. Apparatus for baking wafers, consisting of an oven, an opening in the oven, carriers within the oven upon which molds are adapted to be mounted, means for moving the carriers by successive steps in a circuit through the heated interior of the oven, means for operating the carriers so that on the completion of each step a carrier with its mold completes its circuit and is brought opposite the opening, means for removing the mold on the completion of its circuit from its carrier and withdrawing it from the oven, means for opening the mold when withdrawn to permit the removal of its baked contents, a feeding device comprising a pump having a piston and a delivery pipe for recharging the mold, means for operating the pump and varying the length of stroke imparted to the piston to deliver a charge of wafer material through the delivery pipe onto the base of the open mold, closing and reintroducing the mold into the oven and replacing it upon its carrier.

7. Apparatus for baking wafers, consisting of an oven, an opening in the oven, carriers within the oven upon which molds each comprising a cover and a base are adapted to be mounted, means for moving the carriers by successive steps in a circuit through the heated interior of the oven, means for operating the carriers so that on the completion of each step a carrier with its mold completes its circuit and is brought opposite the opening, means for removing the mold on the completion of its circuit from its carrier and withdrawing it from the oven, means for opening the mold when withdrawn to permit the removal of its baked contents, a feeding device comprising a pump and a delivery pipe for recharging the mold, means for bringing the delivery pipe into position over the base of the mold after it is opened, means for operating the pump to deliver a charge of wafer material through the delivery pipe onto the base of the open mold, withdrawing the delivery pipe, reintroducing the mold into the oven and replacing it upon its carrier.

8. Apparatus for baking wafers, consisting of an oven, an opening in the oven, carriers within the oven upon which molds each comprising a cover and a base are adapted to be mounted, means for moving the carriers by successive steps in a circular circuit about a horizontal axis through the heated interior of the oven, means for operating the carriers so that on the completion of each step a carrier with its mold completes its circuit and is brought opposite the opening, means for removing the mold on the completion of its circuit from its carrier and withdrawing it from the oven in a direction parallel to the horizontal axis, means for opening the mold when withdrawn to permit the removal of its baked contents, means for recharging the mold, and means for closing and reintroducing the mold into the oven and replacing it upon its carrier.

9. Apparatus for baking wafers, consisting of an oven, an opening in the oven, carriers within the oven upon which molds each comprising a cover and a base are adapted to be mounted, locking guides on the carrier for the closed molds to pass beneath when mounted on the carriers, means for moving the carriers by successive steps in a circular circuit about a horizontal axis through the heated interior of the oven, means for operating the carriers so that on the completion of each step a carrier with its mold completes its circuit and is brought opposite the opening, means for removing the mold on the completion of its circuit from its carrier and withdrawing it from the oven, means for opening the mold when withdrawn to permit the removal of its baked contents, means for recharging the mold, and means for closing and reintroducing the mold into the oven and replacing it upon its carrier.

10. Apparatus for baking wafers, consisting of an oven, an opening in the oven, carriers within the oven upon which molds each comprising a cover and a base are adapted to be mounted, means for moving the carriers by successive steps in a circular circuit about a horizontal axis through the heated interior of the oven, means for operating the carriers so that on the completion of each step a carrier with its mold completes its circuit and is brought opposite the opening, a coupling which becomes connected with the mold as it completes its circuit, a rocking lever for operating the coupling to remove the mold on the completion of its circuit from its carrier and withdraw it from the oven in a direction parallel to the horizontal axis, means for opening the mold when withdrawn to permit the removal of its baked contents, means for recharging the mold, and means for closing and reintroducing the mold into the oven and replacing it upon its carrier.

11. Apparatus for baking wafers, consisting of an oven, an opening in the oven, a shaft arranged to rotate about a horizontal axis situated about the center of the oven, a circular series of carriers within the oven concentrically fixed about the shaft upon which molds each comprising a cover and a base are adapted to be mounted, driving means for moving the shaft by successive steps so that on the completion of each step a carrier with its mold completes its circuit and is brought opposite the opening, means actuated by the driving means for removing the mold on the completion of its circuit from its carrier and withdrawing it from the oven, means for opening the mold when withdrawn to permit the removal of its baked contents, means for recharging the mold, and means for closing and reintroducing the mold into the oven and replacing it upon its carrier.

12. Apparatus for baking wafers, consisting of an oven, an opening in the oven, carriers within the oven upon which molds each comprising a cover and a base are adapted to be mounted, means for moving the carriers by successive steps in a circuit through the heated interior of the oven, means for operating the carriers so that on the completion of each step a carrier with its mold completes its circuit and is brought opposite the opening, means for removing the mold on the completion of its circuit from its carrier and withdrawing it from the oven, a depending pivoted catch mounted near the opening at the face of the oven and a part for the catch to engage with on the cover of each mold for opening the mold when withdrawn to permit the removal of its baked contents and for subsequently closing the mold, means for recharging the mold, and means for reintroducing the mold into the oven and replacing it upon its carrier.

13. Apparatus for baking wafers, consisting of an oven, an opening in the oven, a horizontal shaft, carriers fixed about the shaft within the oven upon which molds each comprising a cover and a base are adapted to be mounted, a rotatory driving shaft, means actuated by the rotatory driving shaft for moving the shaft by successive steps so that on the completion of each step a carrier with its mold completes its circuit and is brought opposite the opening, means actuated by the rotatory driving shaft for removing the mold on the completion of its circuit from its carrier and withdrawing it from the oven, means for opening the mold when withdrawn to permit the removal of its baked contents, means for recharging and closing the mold, and means actuated by the rotatory driving shaft for reintroducing the mold into the oven and replacing it upon its carrier.

14. Apparatus for baking wafers, consisting of an oven, an opening in the oven, a horizontal shaft, carriers fixed about the shaft within the oven upon which molds each comprising a cover and a base are adapted to be mounted, a rotatory driving shaft, means actuated by the rotatory driving shaft for moving the shaft by successive steps so that on the completion of each step a carrier with its mold completes a circular circuit and is brought opposite the opening, a coupling which becomes connected with the mold as it completes its circuit, a rocking lever actuated by the rotatory driving shaft for operating the coupling to remove the mold on the completion of its circuit from its carrier and withdraw it from the oven and subsequently reintroduce the mold into the oven and replace it upon its carrier, means for opening the mold when withdrawn to permit the removal of its baked contents, means for recharging the mold, and means for closing the mold.

15. Apparatus for baking wafers, consisting of an oven, an opening in the oven, a horizontal shaft, carriers fixed about the shaft within the oven upon which molds each comprising a cover and a base are adapted to be mounted, a rotatory driving shaft, a crank and tappet gear actuated by the rotatory driving shaft for moving the carriers by successive steps so that on the completion of each step a carrier with its mold completes a circular circuit and is brought opposite the opening, a second crank actuated by the rotatory driving shaft, a rocking lever, a cam groove in the rocking lever with which the second crank engages, a coupling on the rocking lever which becomes connected with the mold as it completes its circuit, means for opening the mold when withdrawn to permit the removal of its baked contents, and means for recharging and closing the mold, for the purposes set forth.

16. Apparatus for baking wafers, consisting of an oven, an opening in the oven, a horizontal shaft, carriers fixed about the shaft within the oven upon which molds each comprising a cover and a base are adapted to be mounted, a rotatory driving shaft, means actuated by the rotatory driving shaft for moving the shaft by successive steps so that on the completion of each step a carrier with its mold completes a circular circuit and is brought opposite the opening, a crank actuated by the rotatory driving shaft, a rocking lever actuated by the crank, a coupling on the rocking lever which becomes connected with the mold as it completes its circuit, means for opening the mold when withdrawn to permit the removal of its baked contents, a feeding device comprising a pump and a pivoted delivery pipe, a tappet arm connected with the delivery pipe acted on by the crank, an abutment on the rocking lever for acting on the rod of the piston of the pump, and means for closing the mold, for the purposes set forth.

17. Apparatus for baking wafers, consisting of an oven, an opening in the oven, a horizontal shaft, carriers fixed about the shaft within the oven upon which molds each comprising a cover and a base are adapted to be mounted, a rotatory driving shaft, a crank and gear operated by the crank actuated by the rotatory driving shaft for moving the shaft by successive steps so that on the completion of each step a carrier with its mold completes a circular circuit and is brought opposite the opening, a second crank actuated by the rotatory driving shaft, a rocking lever rockable in a direction parallel to the axis of the horizontal shaft, actuated by the second crank, a coupling on the rocking lever which becomes connected with the mold as it completes its circuit, means for opening the mold when withdrawn to permit the removal of its baked contents, a feeding device comprising a pump and a pivoted delivery pipe, a tappet arm connected with the delivery pipe acted on by the second crank, an abutment on the rocking lever for acting on the rod of the piston of the pump, and means for closing the mold, for the purposes set forth.

HUGH WATSON MACKENZIE.

Witnesses:
J. ALFRED BREWER,
DORA E. BAILLIE.